(12) United States Patent
Reed et al.

(10) Patent No.: US 7,011,361 B2
(45) Date of Patent: Mar. 14, 2006

(54) AUTOMOTIVE VEHICLE BODY HAVING TAILOR WELDED BLANKS

(75) Inventors: John T. Reed, Royal Oak, MI (US); Paul Elia, West Bloomfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 54 days.

(21) Appl. No.: 10/708,588

(22) Filed: Mar. 12, 2004

(65) Prior Publication Data

US 2005/0200164 A1    Sep. 15, 2005

(51) Int. Cl.
*B60R 21/02*    (2006.01)
(52) U.S. Cl. .............................. 296/203.03; 296/193.05
(58) Field of Classification Search .......... 296/203.03, 296/193.05, 146.9, 202, 203.04
See application file for complete search history.

(56) References Cited

U.S. PATENT DOCUMENTS

| | | | |
|---|---|---|---|
| 5,782,523 | A | 7/1998 | Heldt et al. |
| 6,012,765 | A | 1/2000 | Novoa et al. |
| 6,015,182 | A | 1/2000 | Weissert et al. |
| 6,053,561 | A | 4/2000 | Hojnowski et al. |
| 6,439,653 | B1 | 8/2002 | Ourchane et al. |
| 2002/0190544 | A1 | 12/2002 | Yamamoto et al. |

*Primary Examiner*—Joseph D. Pape
(74) *Attorney, Agent, or Firm*—Gigette M. Bejin; Artz & Artz, P.C.

(57) ABSTRACT

An automotive vehicle body includes a floor structure, a roof structure and a door opening panel welded to the floor and roof structure. The door opening panel is formed from a tailor welded metal blank furnishing a first thickness of metal for a lower portion of the door opening panel and a second thickness of material for an upper portion of the door opening panel. The lower and upper portions of the door opening panel are joined at an approximately horizontal weld line which is concealed by a passenger door, and in one embodiment, a pickup box.

12 Claims, 3 Drawing Sheets

AUTOMOTIVE VEHICLE BODY HAVING TAILOR WELDED BLANKS

BACKGROUND OF INVENTION

1. Field of the Invention

The present invention relates to an automotive body in which the door opening panels are formed from tailor welded blanks having different thicknesses of steel combined into a single assembly for use in a stamping press to form the left and right side door opening panels. The blanks are welded along a horizontal seam which is covered in one embodiment by a door and a pickup box, which is shingled over a portion of the cab, thereby eliminating the need for added metal finishing of the weld seam.

2. Disclosure Information

Automotive bodies, particularly those used in sedans and pickup trucks, typically use door opening panels for the purpose of framing the doorways for passenger ingress and egress. Such door opening panels typically comprise several stampings welded into a complete assembly. Because of the requirements for managing energy in the event of a vehicle collision, door opening panels frequently require multiple reinforcements in the area of the door sills and other parts of the panel. Such reinforcements are provided at a great deal of expense because the reinforcement must be separately tooled, stamped, and welded to the door opening panel. Of course, spot welds which are visible often give rise to the need for expensive secondary metal finishing operations. Moreover, the quality control process is rendered much more difficult because a high percentage of the spot welds needed for the reinforcements must have high integrity in order for the finished vehicle to meet various customer requirements.

The present door opening panel solves the problems associated with prior art door opening panels by providing a heavier gauge thickness of metal in a lower portion of a blank used to form the door opening panel, and a lighter gauge portion of metal on the upper part of the blank Advantageously, the weld line or seam between the upper and lower portions of the door opening panel blank is concealed in the final construction to a very great extent by the hinges used to mount doors to the door opening panel, or by other hardware.

SUMMARY OF INVENTION

An automotive vehicle body includes a floor structure, a roof, and a door opening panel welded to the floor structure and to the roof, with the door opening panel being formed from a tailor welded metal blank providing a first thickness of material for a lower portion of the door opening panel and a second thickness of material for an upper portion of the door opening panel. The lower and upper portions of the finished door opening panel are joined by an approximately horizontal weld joint.

According to another aspect of the present invention, the weld line joining the lower and upper portions of the door opening panel is linear. A door opening panel according to present invention may be formed from steel or aluminum or other metals known to those skilled in the art and suggested by this disclosure. The welding between the upper and lower portions of the tailor welded blank may be accomplished by laser welding or other types of welding known to those skilled in the art and suggested by this disclosure. In one embodiment, the lower portion of the door opening panel will have a thicker gauge of material than the material comprising the upper portion of the door opening panel.

According to another aspect of the present invention, an automotive vehicle further comprises a pickup box having a leading end extending laterally outwardly and forward of the rear corner of said door opening panel so as to conceal a portion of the weld line joining the upper and lower parts of the door opening panel.

An automotive vehicle according to the present invention further includes a passenger door mounted over a portion of the weld line between the upper and lower parts of the door opening panel. The passenger doors may include a front passenger door and a rear passenger door with each of the doors being attached to a door opening panel with hinges mounted such that the doors overlie the weld line when closed. Those skilled in the art will appreciate in view of this disclosure that the present invention could be employed with numerous types of automotive vehicles, including, but not limited to sedans, trucks, vans, and other types of vehicles.

According to another aspect of the present invention, a door opening panel further includes a inner door opening panel mounted to an interior portion of the door opening panel.

According to another aspect of the present invention, a method for fabricating and installing a door opening panel for an automotive vehicle comprises the steps of stamping a plurality of metal sub-blanks with said sub-blanks having at least two different gauge thicknesses, and joining the sub-blanks with the linear weld joint. The present method continues with the steps of stamping the welded sub-blanks so as to form a door opening panel, and welding said door opening panel to an automotive body such that the weld joint is oriented generally horizontally.

It is an advantage of the present invention that the present door opening panel provides secure mounting for doors and secure door sill area without the necessity of extra weight and cost and the associated difficulty of forming a part having a heavier gauge thickness in both the lower and upper portions of the door opening panel.

It is a further advantage of a method and system according to the present invention that the need for certain reinforcement parts and associated spot welding and metal finishing operations is eliminated.

It is a further advantage of a method and system according to the present invention that wind noise resistant inset passenger doors may used without undesirable closed door exposure of an unsightly weld seam. In the absence of the present invention, limousine-style doors would be the order of the day.

Other advantages, as well as objects and features of the present invention, will become apparent to the reader of this specification.

DETAILED DESCRIPTION

Figure 1:
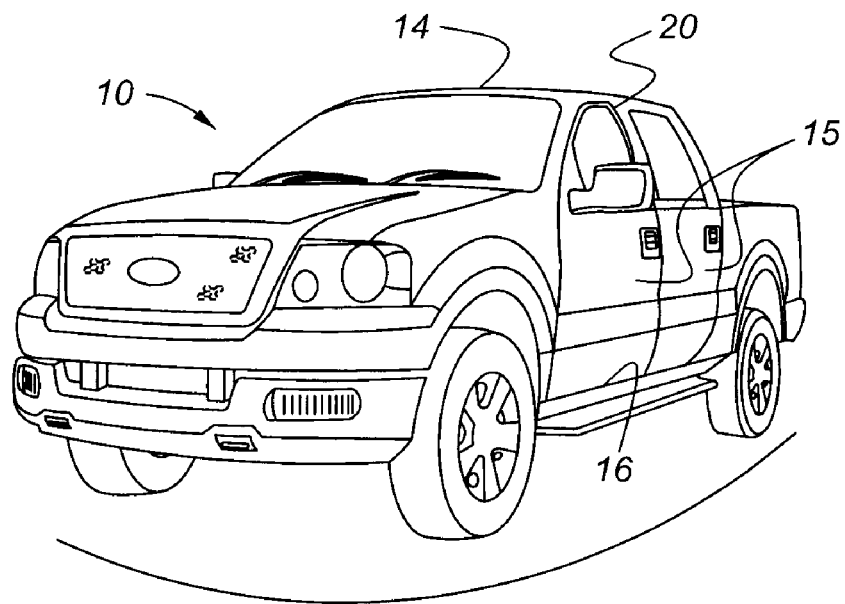
FIG. 1 is a perspective view of an automotive vehicle having a door opening panel and doors according to the present invention.

As shown in FIG. 1, a vehicle has body 10 with a roof 14 and floor 16. Doors 15, which have an inset design, are hinged to body 10. The use of inset doors is facilitated by the present invention because the present door opening panel has only a single weld seam or line, located generally horizontally in a region which is covered over by door 15 when it is in the closed position.

Figure 2:
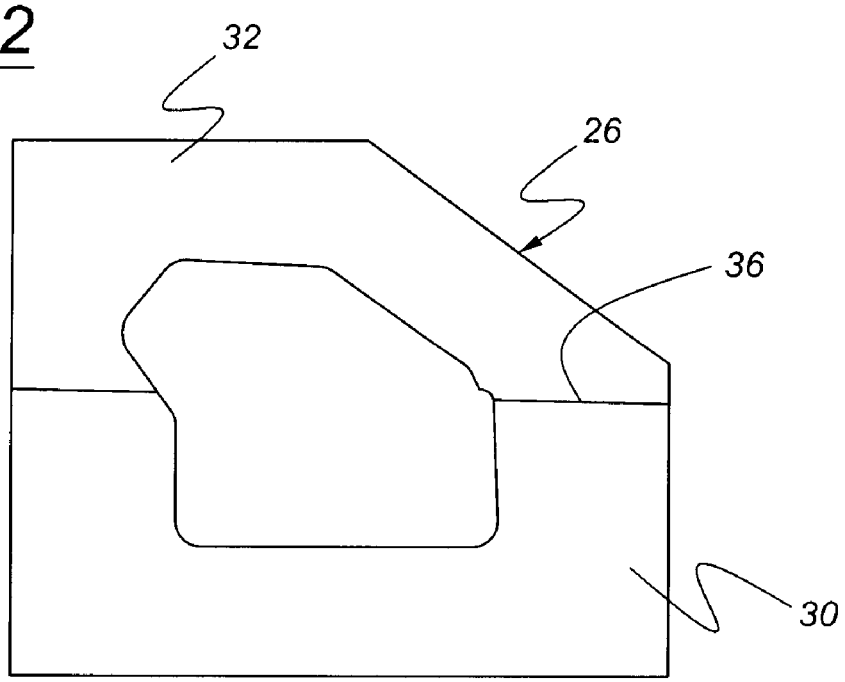
FIG. 2 illustrates a tailor welded blank according to one aspect of the present invention.

Door opening panel 20 is joined by spot or fusion welding to both roof 14 and to floor 16. Those skilled in the art will appreciate in view of this disclosure, however, that door opening panel 20 could be joined to floor 14 and floor 16 by other means such as bonding, friction welding, riveting, other types of mechanical joining, and other types of welding processes known to those skilled in the art and suggested by this disclosure. As shown in FIG. 2, door opening panel 20 begins as tailor welded blank 26. In an example used in a pickup truck manufactured by Ford Motor Company of Dearborn, Mich., blank 26 is about 80" long and about 68" high, with the lower portion 30 comprising steel having a thickness of about 2.2 mm, and with upper portion 32 of blank 26 having a thickness of about 1.2 mm. As is further shown in FIG. 2, weld 36 extends across blank 26 in a generally horizontal fashion. This orientation of weld 36 promotes the impressive savings by the present invention in terms of processing time, material cost, and weight of the finished product.

Figure 3:
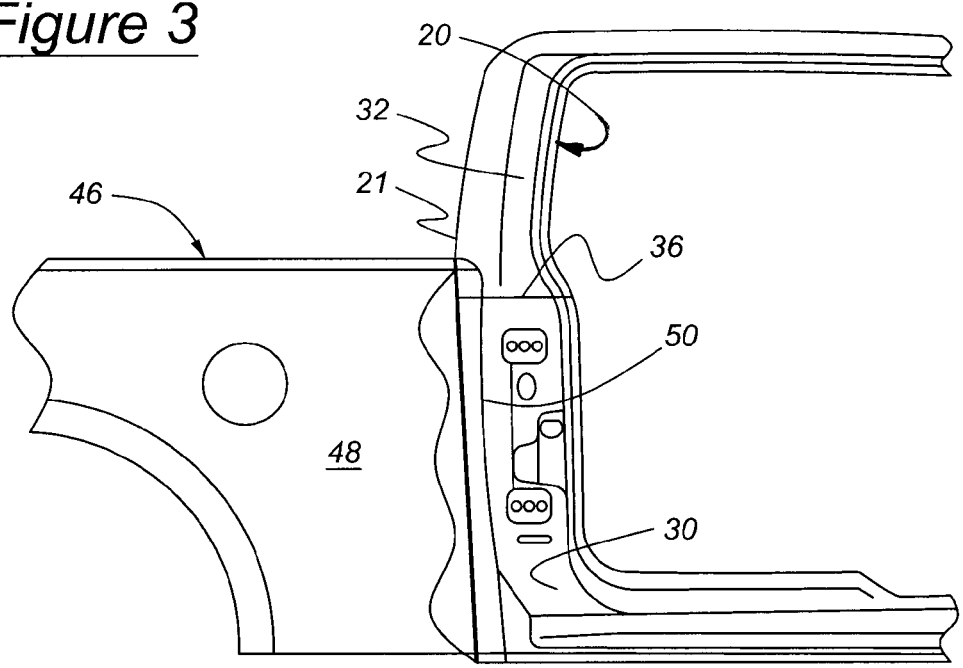
FIG. 3 shows a portion of a vehicle having a door opening panel according to the present invention.
Figure 4:
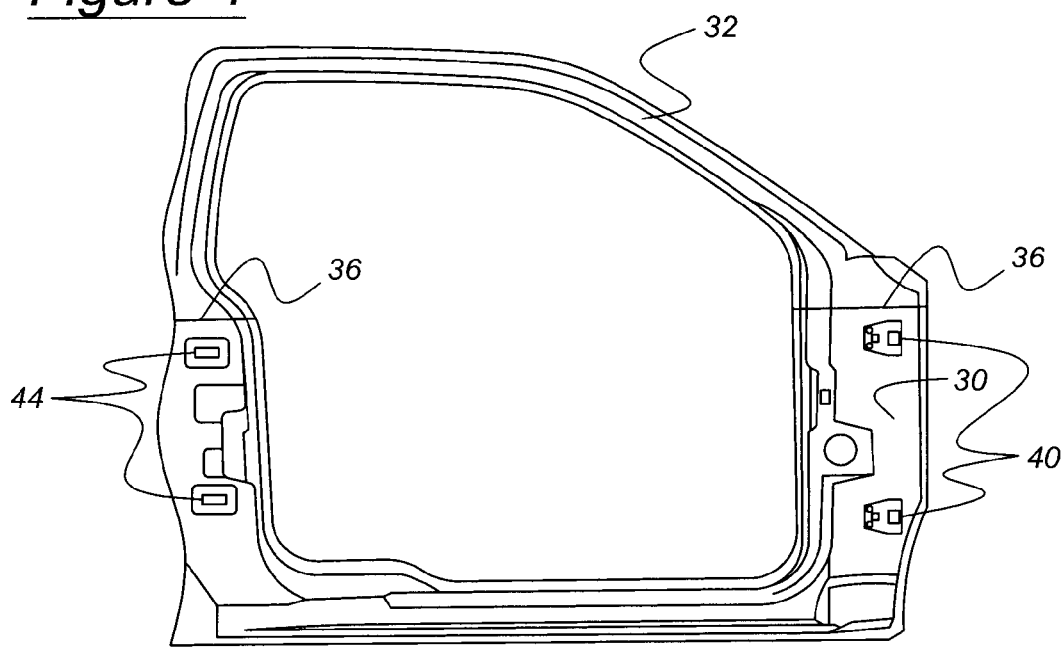
FIG. 4 is an exterior view of a finished door opening panel according to the present invention.

As shown in FIG. 4, hinges 40 and 44 are positioned upon the heavier gauge metal of lower portion 30, so that door 15 conceals a portion of weld 36 in the finished vehicle. FIG. 3 shows a further concealment of weld line 36, inasmuch as side panel 48 of pickup box 46 has a leading end 50 which extends laterally, outwardly and forward of the rear corner 21 of door opening panel 20. In essence, side panel 48 overlies weld line 36 much as a roofing shingle overlies the parting line between other adjacent shingles.

Figure 5:
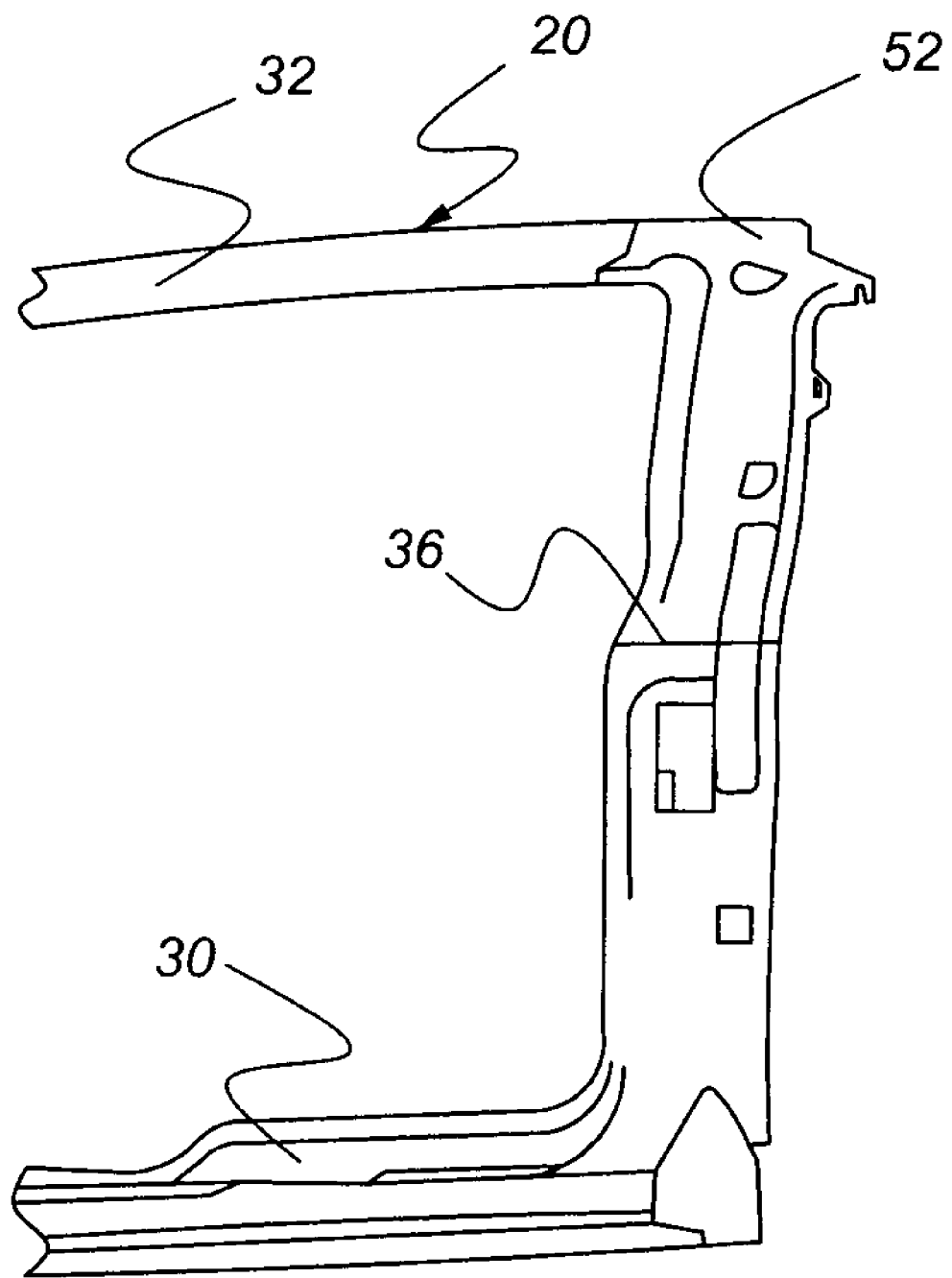
FIG. 5 illustrates an interior view of a portion of a door opening panel according to the present invention.

FIG. 5 illustrates an inner portion of door opening panel 20 in which member 52 is applied for the purpose of allowing the mounting of trim parts (not shown), and also to fill out the section of the door opening panel. Added reinforcement is not required in the lower portion of door opening panel 20 which forms a portion of the door sill of body 10. This underscores but one advantage of the current system and structure the elimination of several reinforcements which would otherwise be needed if a thinner gauge of metal appropriate for the upper portion of the door opening panel were to be employed for the entire panel.

According to the present invention, a method for fabricating and installing door opening panel 20 for an automotive vehicle includes the steps of stamping tailor welded blank 26 as shown in FIG. 2 to produce door opening panel 20 shown in FIG. 4 as having generally horizontal weld seam 36, followed by welding door opening panel 20 to roof 14 and floor 16 of body 10, as shown in FIG. 1, while maintaining the generally horizontal orientation of weld 36.

Although the present invention has been described in connection with particular embodiments thereof, it is to be understood that various modifications, alterations, and adaptations may be made by those skilled in the art without departing from the spirit and scope of the invention set forth in the following claims.

What is claimed is:

1. An automotive vehicle body, comprising:
    a floor structure;
    a roof; a door opening panel welded to said floor structure and to said roof, with said door opening panel being formed from a tailor welded metal blank furnishing a first thickness of material for a lower portion of the door opening panel blank, and a second thickness of material for an upper portion of said door opening panel, with said upper and lower portions being joined at an approximately horizontal weld line.

2. An automotive vehicle body according to claim 1, wherein said weld line is linear.

3. An automotive vehicle body according to claim 1, wherein said tailor welded blank comprises a steel alloy.

4. An automotive vehicle body according to claim 1, wherein said tailor welded blank comprises an aluminum alloy.

5. An automotive vehicle body according to claim 1, wherein said upper and lower portions of said tailor welded blank are welded by a laser welding process.

6. An automotive vehicle body according to claim 1, wherein the said lower portion of said tailor welded blank is thicker material than the upper portion of said tailor welded blank.

7. An automotive vehicle body according to claim 1, further comprising a pickup box having a leading end extending laterally outwardly and forward of a rear corner of said door opening panel so as to conceal a portion of said weld line.

8. An automotive vehicle body according to claim 1, further comprising a passenger door mounted so as to conceal a portion of said weld line by overlying said weld line when said door is in a closed position.

9. An automotive vehicle body according to claim 1, further comprising a front passenger door and a rear passenger door, with each of said doors being attached to said door opening panel so as to overlie said weld line.

10. An automotive vehicle body according to claim 1, further comprising an inner door opening panel welded to a generally vertical interior portion of said door opening panel.

11. An automotive vehicle body, comprising:
    a floor structure;
    a roof structure;
    a plurality of door opening panels welded to said floor structure and to said roof structure, with each of said panel being formed from a metal blank having a greater thickness of metal at a lower portion of said blank and a lesser of thickness of metal at the upper portion of said blank, with said lower and upper parts being joined by an approximately horizontal weld; and
    a plurality of doors attached to the body with at least some of said doors having at least one hinge mounted to said body so as to overlie said horizontal weld.

12. An automotive vehicle body according to claim 11, further comprising a cargo structure overlying at least a portion of the weld lines of said plurality of door opening panels.

* * * * *